United States Patent
Kim et al.

(10) Patent No.: US 8,020,933 B2
(45) Date of Patent: Sep. 20, 2011

(54) LUMBAR SUPPORT DEVICE OF SEAT FOR VEHICLES

(75) Inventors: Tae Hyung Kim, Gunpo-si (KR); Byeong Joon Min, Gwangmyeong-si (KR); Deok Soo Lim, Hwaseong-si (KR); Ji Hyun Kim, Anyang-si (KR); Sam Jae Cho, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 178 days.

(21) Appl. No.: 12/479,020

(22) Filed: Jun. 5, 2009

(65) Prior Publication Data

US 2010/0127543 A1 May 27, 2010

(30) Foreign Application Priority Data

Nov. 27, 2008 (KR) .................. 10-2008-0119165

(51) Int. Cl.
*B60N 2/66* (2006.01)
(52) U.S. Cl. ................... 297/284.9; 297/284.8
(58) Field of Classification Search ............... 297/284.4, 297/284.8, 284.9
See application file for complete search history.

(56) References Cited

U.S. PATENT DOCUMENTS

| | | | | |
|---|---|---|---|---|
| 4,636,000 A * | 1/1987 | Nishino | | 297/284.9 |
| 5,088,790 A * | 2/1992 | Wainwright et al. | | 297/284.4 |
| 5,553,919 A * | 9/1996 | Dennis | | 297/284.8 |
| 5,769,490 A * | 6/1998 | Falzon | | 297/284.4 |
| 5,954,399 A * | 9/1999 | Hong | | 297/284.4 |
| 7,000,986 B2 * | 2/2006 | Cruz Fernandes de Pinho et al. | | 297/284.4 |
| 7,140,681 B2 * | 11/2006 | McMillen | | 297/284.9 |
| 7,488,039 B2 * | 2/2009 | Fischer et al. | | 297/284.4 |
| 7,490,899 B2 * | 2/2009 | McMillen | | 297/284.1 |
| 7,766,425 B2 * | 8/2010 | Poniatowski | | 297/284.9 |

* cited by examiner

*Primary Examiner* — Peter R. Brown
(74) *Attorney, Agent, or Firm* — Morgan, Lewis & Bockius LLP

(57) ABSTRACT

A lumbar support device of a seat for a vehicle surrounds and supports the lumbar region of a passenger. In the lumbar support device, a mounting bracket is fastened to a seat back frame. A support panel is coupled to the mounting bracket through link units so as to be movable ahead of the seat back frame. Side support units are coupled to respective opposite ends of the support panel so as to be rotatable. A connection wire is connected between each of the side support units and the corresponding link unit of the support panel such that when the support panel moves forwards, the side support units surround side portions of the lumbar region of the passenger.

8 Claims, 4 Drawing Sheets

LUMBAR SUPPORT DEVICE OF SEAT FOR VEHICLES

CROSS-REFERENCE TO RELATED APPLICATION

The present application claims priority to Korean Patent Application Number 10-2008-0119165 filed Nov. 27, 2008, the entire contents of which application is incorporated herein for all purposes by this reference.

BACKGROUND OF THE INVENTION

1. Field of the Invention

The present invention relates to a lumbar support device of a seat for a vehicle which supports the lumbar region of a passenger.

2. Description of Related Art

As well known to those skilled in the art, seats are provided in vehicles to support passengers, absorb vibration transmitted from road surfaces, and reduce fatigue of the passengers.

Furthermore, a lumbar support for supporting the lumbar region of a passenger is provided in such a seat. The lumbar support evenly disperses pressure applied to the body of the passenger to minimize fatigue of the passenger even after having sat on the seat for a long time.

However, the conventional lumbar support supports only the backbone portion of the lumbar region of the passenger. Thus, the posture of the passenger who sits on the seat may become poor. In the case where the passenger sits on the seat for a long time, fatigue of the lumbar region of the passenger accumulates. As well, when the passenger sits on the seat, spaces are defined between the side portions of the passenger and the sides of the seat back. These spaces deteriorate the comfort of the ride felt by the passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention address the above problems occurring in the prior art, and provide for a lumbar support device of a seat for vehicles which is constructed such that the entire lumbar region of a passenger who sits on the seat is brought into close contact with the seat.

One aspect of the present invention is directed to a lumbar support device of a seat for a vehicle, comprising a mounting bracket fastened to a seat back frame, a support panel coupled to the mounting bracket through link units so as to be movable ahead of the seat back frame, side support units coupled to respective opposite ends of the support panel so as to be rotatable, and/or a connection wire connected between each of the side support units and a corresponding link unit of the link units of the support panel such that when the support panel moves forwards, the side support units surround side portions of a lumbar region of a passenger.

The link units may support the opposite ends of the support panel, and each of the link units may include a double link structure including a front link hinged to the support panel and a rear link hinged to the mounting bracket. An actuating wire may be connected to each of the link units, wherein the actuating wire may be connected to a hinge shaft provided between the front link and the rear link. The actuating wires may be connected to an operation control unit, and the operation control unit may generate an actuating force for extending the link units.

Each of the side support units may include a slide member provided on the support panel so as to be slidable in a longitudinal directional of the support panel, a rotary member coupled to the slide member so as to be rotatable, a locking member protruding from the rotary member at a predetermined angle relative to the rotary member, the locking member being connected to the corresponding connection wire, and/or an elastic spring for elastically supporting the slide member.

A slide slot may be formed through each of the opposite ends of the support panel, and the slide member may move along the slide slot on the support panel. The side support units may include a first side support unit and a second side support unit which are respectively provided on the opposite ends of the support panel to surround the side portions of the lumbar region of the passenger. A guide member may be provided on the mounting bracket to guide movement of the actuating wires, and the actuating wires may pass through the guide member.

Another aspect of the present invention is directed to a vehicle seat including any of the above-described lumbar support devices.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
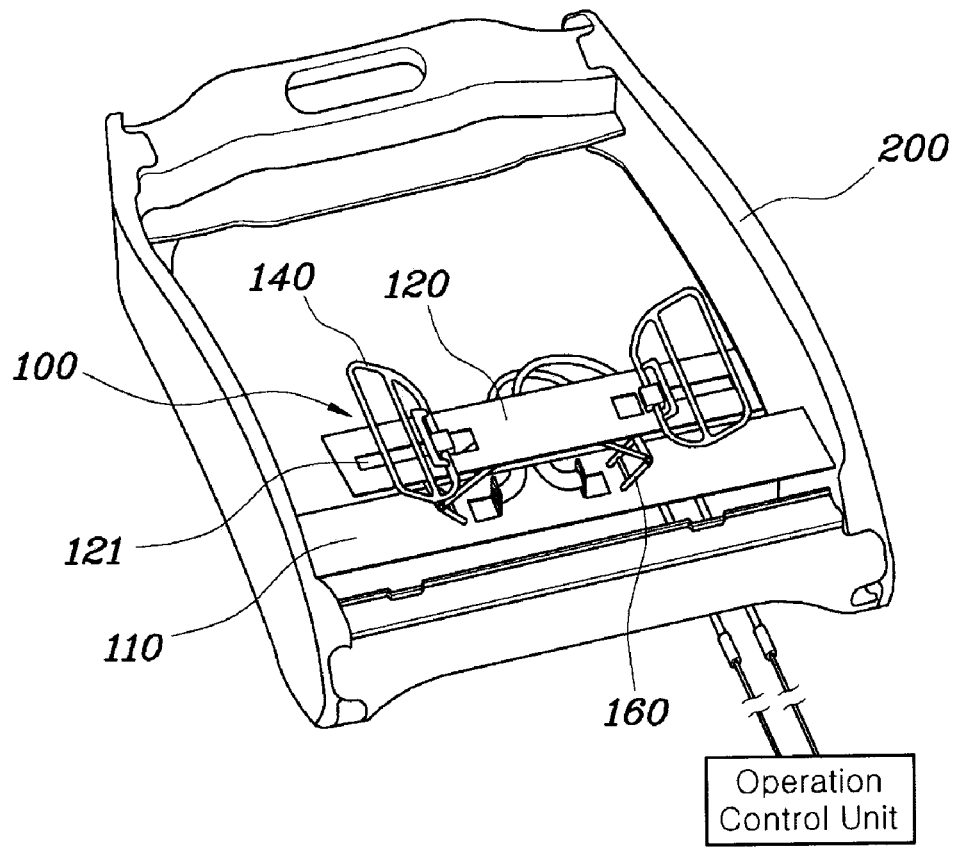
FIG. 1 is a view illustrating an exemplary lumbar support device mounted to a seat back frame for a vehicle according to the present invention.
Figure 2:
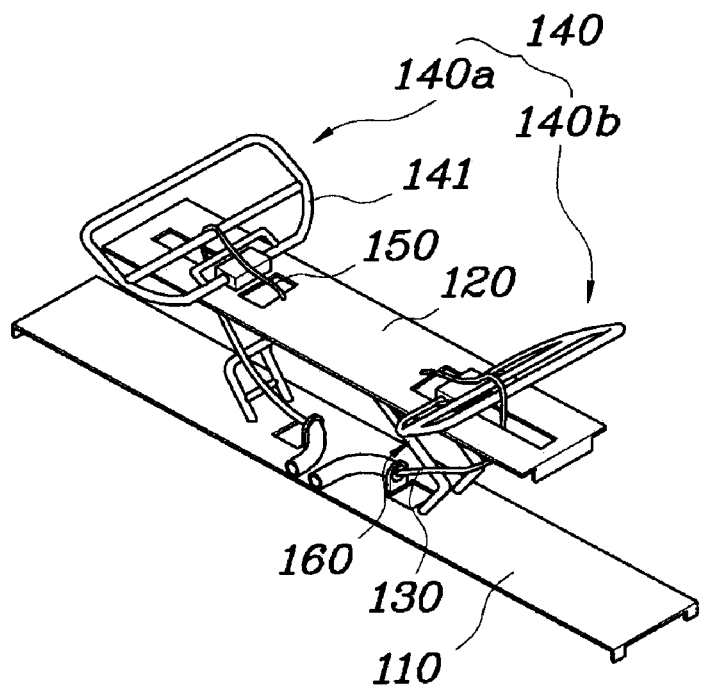
FIG. 2 is a perspective view illustrating the lumbar support device of a seat for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

As shown in FIGS. 1 through 3B, an exemplary lumbar support device of a seat for a vehicle according to the present invention is characterized in that the entire portion of the lumbar region of a passenger is surrounded by and are brought into close contact with the seat both by a support panel 120 which supports the rear portion of the lumbar region of the passenger, and by side support units 140 which support the side portions of the lumbar region of the passenger.

To achieve the above-mentioned purposes, the lumbar support device of the present invention includes a mounting bracket 110, the support panel 120 which is mounted to the mounting bracket 110 so as to be movable ahead of a seat back frame 200, and the side support units 140 which are rotatably provided on the respective opposite ends of the support panel 120.

In detail, the mounting bracket 110 is fastened to the seat back frame 200 at a position corresponding to the lumbar region of the passenger who sits on the seat. The support panel 120 is mounted to the front surface of the mounting bracket 110 through link units 160 so as to be movable forwards.

Each link unit 160 has a double link structure, which includes a front link 161 hinged to the support panel 120 and a rear link 162 hinged to the seat back frame 200. The front link 161 is hinged to the rear link 162. The support panel 120 is moved forwards by extension of the link units 160. The support panel 120 which has been moved forwards is moved backwards by contraction of the link units 160.

The link units 160 are operated by an operation control unit, which is coupled to the link units 160 through actuating wires 130. The operation control unit extends the link units 160 in such a way as to pull the actuating wires 130, thus moving the support panel 120 forwards.

The operation control unit may be activated using an actuating button or other suitable means, which is provided such that the actuating wires 130 are pulled by applying electric power, or a mechanical lever which pulls the actuating wires 130 using a swinging motion thereof. Furthermore, the operation control unit may comprise an automatic control unit which has a separate sensor for detecting whether a passenger sits on the seat and pulls the actuating wires 130 in such a way as to apply electric power when the passenger sits on the seat.

Each actuating wire 130 is connected at a first end thereof to a hinge shaft between the corresponding front and rear links 161 and 162 and is connected at a second end thereof to the operation control unit. Thus, when the actuating wires 130 pull the hinge shafts of the link units 160 by the operation of the operation control unit, the link units 160 which have been folded are extended, so that the support panel 120 is moved forwards.

Here, the movement of each actuating wire 130 is guided by a guide member 170, which is fastened to the mounting bracket 110. The guide member 170 has a guide hole, through which the actuating wire 130 passes, and functions to smoothly transmit operating force of the operation control unit to the corresponding link unit 160.

The link units 160 are hinged to the support panel 120. Each link unit 160 is coupled to the corresponding side support unit 140 through a connection wire 150. The connection wire 150 is connected at a first end thereof to the front link 161 and connected at a second end thereof to the side support unit 140. Thus, when the support panel 120 is moved away from the mounting bracket 110 by pulling the actuating wires 130, the connection wires 150 pull the respective side support units 140.

In various embodiments, although the first end of each connection wire 150 has been illustrated as being connected to the front link 161 of the corresponding link unit 160, it may be connected to the rear link 162 or the mounting bracket 110. In this case, when the support panel 120 is moved away from the mounting bracket 110 by pulling the actuating wires 130, the connection wires 150 can also pull the respective side support units 140.

The support panel 120 has a shape appropriate to support the rear portion of the lumbar region of the passenger. Slide slots 121 are formed through the respective opposite ends of the support panel 120 and extend in the longitudinal direction of the support panel 120. The side support units 140 are slidably coupled to the respective slide slots 121.

Figure 4A:
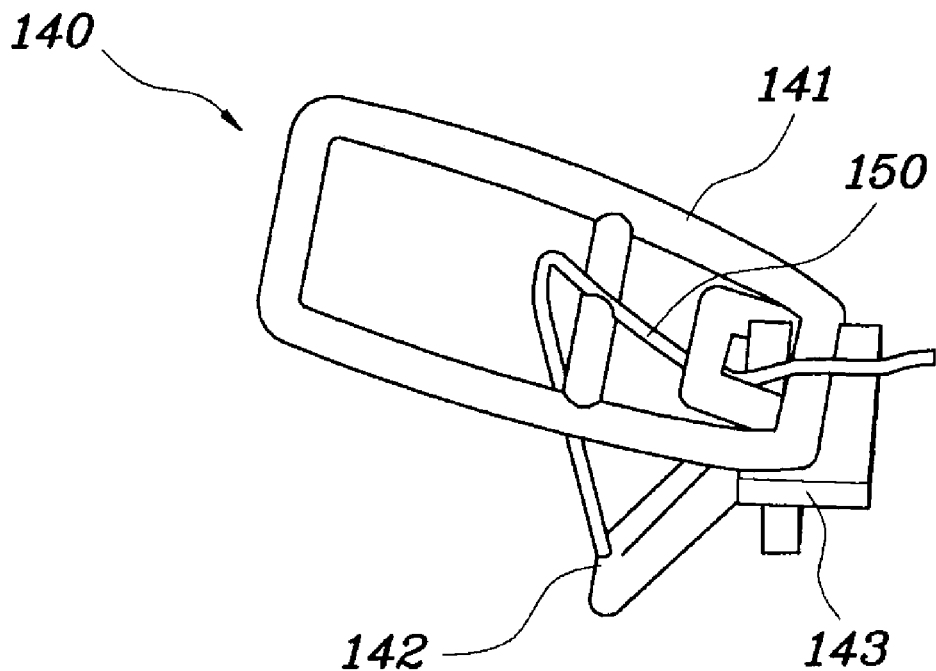
FIG. 4A is a perspective view showing an enlargement of a side support unit of the lumbar support device according to the present invention.
Figure 4B:
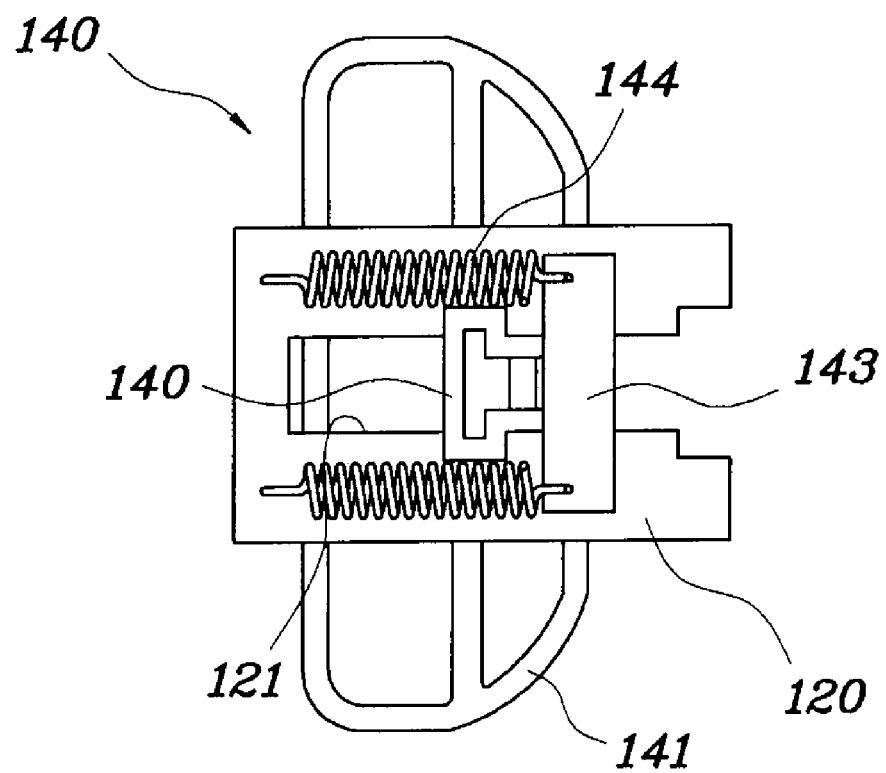
FIG. 4B is a rear view of the side support unit of FIG. 4A.

As shown in FIG. 4A or 4B, the side support units 140 include a first side support unit 140a and a second side support unit 140b which are respectively provided on the opposite ends of the support panel 120 to support the side portions of the lumbar region of the passenger.

In detail, each side support unit 140 includes a slide member 143, which is slidably coupled to the corresponding slide slot 121 of the support panel 120, and a rotary member 141, which is rotatably mounted to the slide member 143. The side support unit 140 further includes a locking member 142 which protrudes from one end of the rotary member 141 and is connected to the connection wire 150, and an elastic spring 144 which is connected between the slide member 143 and the corresponding end of the support panel 120 to elastically support the slide member 143.

Figure 5A:
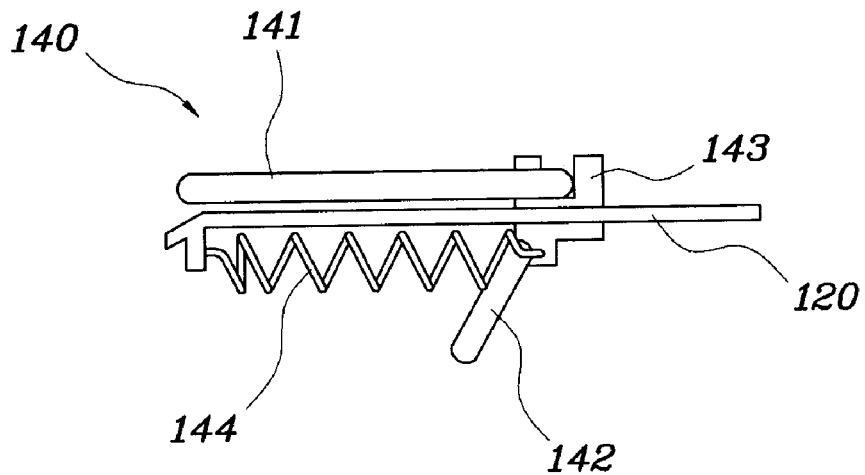
FIGS. 5A through 5C illustrate the operation of the side support unit of FIG. 4A.

As shown in FIG. 5A, when the support panel 120 is at its original position (in other words, in a state before the support panel 120 has been moved forwards), the slide member 143 is disposed adjacent to the corresponding end of the support panel 120 by the elastic restoring force of the elastic spring 144. The rotary member 141 maintains a state of being parallel to the support panel 120.

Figure 5B:
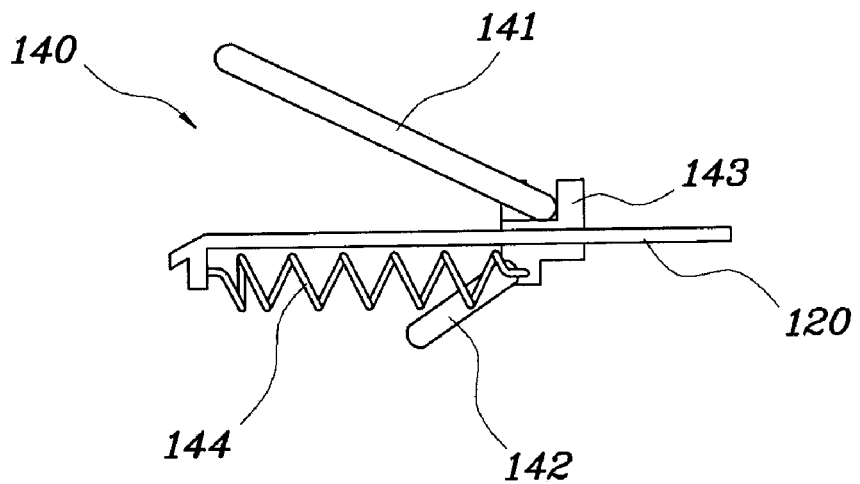

As shown in FIG. 5B, when the support panel 120 is initially moved forwards, the connection wire 150 pulls the locking member 142. Then, the rotary member 141 which is supported by the slide member 143 is rotated around the slide member 143 towards the medial portion of the support panel 120. Thereafter, the locking member 142 is locked to the support panel 120.

Figure 5C:
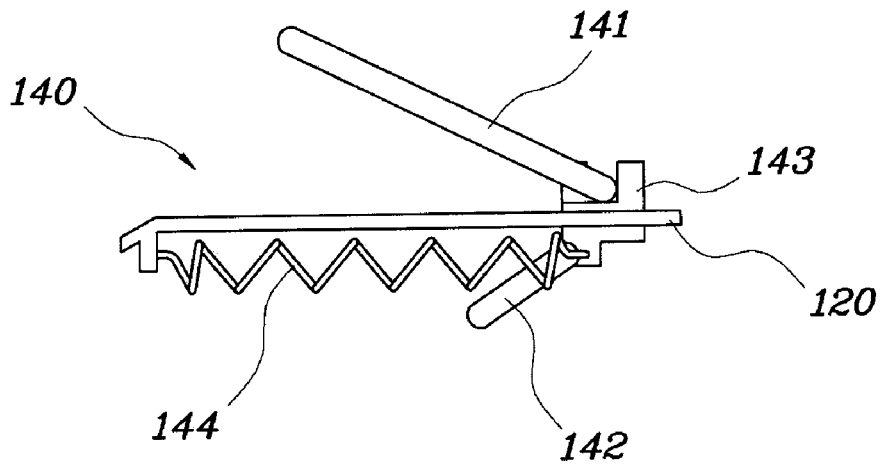

As shown in FIG. 5C, subsequently, when the support panel 120 is further moved forwards and the connection wire 150 thus further pulls the locking member 142, the slide member 143 moves along the slide slot 121 of the support panel 120 towards the medial portion of the support panel 120 while the locking member 142 is in the state of having been locked to the support panel 120. Then, the rotary member 141 of the side support unit 140 can support the side portion of the lumbar region of the passenger, and the support panel 120 which has been moved forwards can support the rear portion of the lumbar region of the passenger.

When the support panel 120 is returned to its original position, the tension of the connection wire 150 is removed, and the slide member 143 is moved its original position by the elastic restoring force of the elastic spring 144.

The operation of the lumbar support device according to the present invention having the above-mentioned construction will be explained below.

Figure 3A:
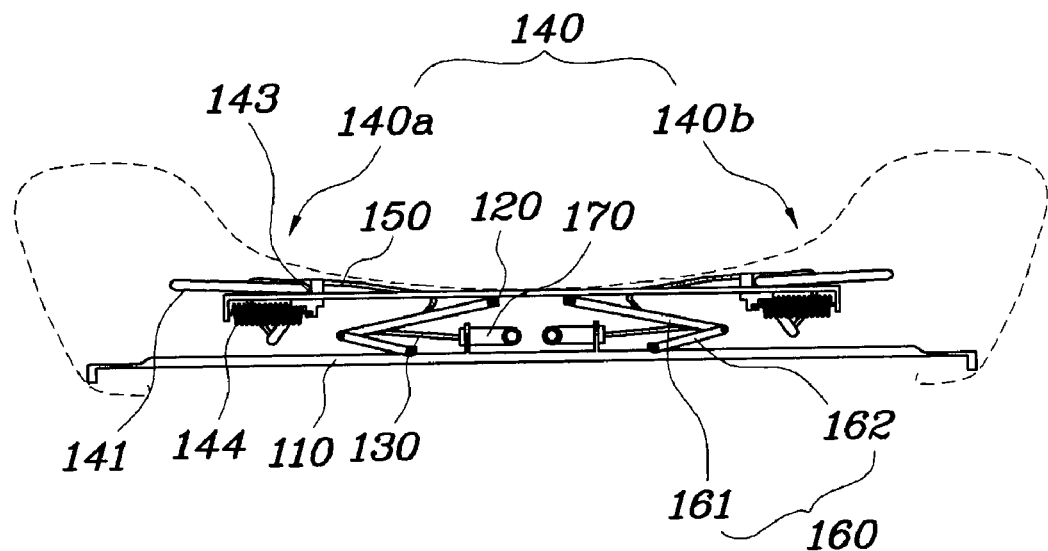
FIG. 3A is a view showing the installation of the lumbar support device of FIG. 2.

As shown in FIG. 3A, in a state before the actuating wires 130 are pulled, the link units 160 are in the contracted states such that the support panel 120 is adjacent to the mounting bracket 110. Furthermore, the rotary members 141 are in the state of being parallel and adjacent to the support panel 120.

Figure 3B:
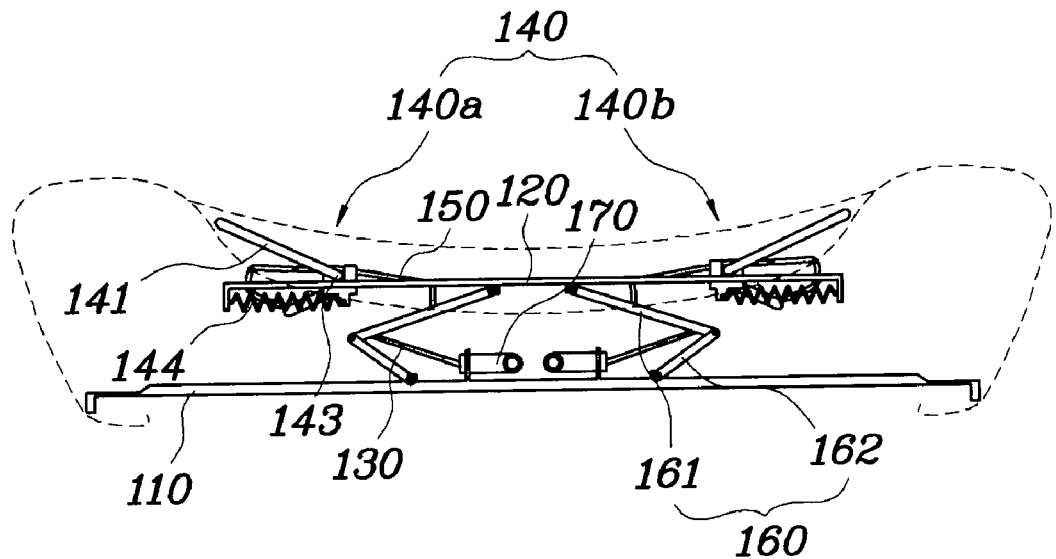
FIG. 3B is a view showing the operation of the lumbar support device of FIG. 2.

As shown in FIG. 3B, when the actuating wires 130 are pulled by actuating force applied from the operation control unit, the actuating wires 130 pull the hinge shafts of the link units 160, so that the support panel 120 is moved forwards. At this time, the connection wires 150 pull the locking members 142 of the corresponding side support units 140. Then, the rotary units 141 are rotated around the slide members 143 towards the medial portion of the support panel 120.

Thereafter, when the connection wires 150 further pull the locking members 142, the slide members 143 are moved towards the medial portion of the support panel 120 along the corresponding slide slots 121 of the support panel 120 in the state in which the locking members 142 have been locked to the support panel 120. The rotary members 141 of the side support unit 140 which have been rotated forwards can support the side portions of the passenger.

As such, the support panel 120 and the side support units 140 support and surround the rear portion and the side portions of the lumbar region of the passenger. Hence, the passenger brings his/her lumbar region into contact with the support panel 120 and the side support units 140 and thus is able to comfortably sit on the seat.

As described above, a lumbar support device of a seat for a vehicle according to the present invention can support not only the backbone portion of the lumbar region of a passenger but also the side portions of the lumbar region. Therefore, the entire lumbar region of the passenger can be in close contact with the seat, so that the passenger can comfortably sit on the seat.

For convenience in explanation and accurate definition in the appended claims, the terms "front", "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lumbar support device of a seat for a vehicle, comprising:
    a mounting bracket fastened to a seat back frame;
    a support panel coupled to the mounting bracket through link units so as to be movable ahead of the seat back frame;
    an actuator coupled to the link units and the mounting bracket;
    side support units coupled to respective opposite ends of the support panel so as to be rotatable in forward and rearward directions; and
    a connection wire connected between each of the side support units and a corresponding link unit of the link units of the support panel such that when the support panel moves forwards, the extension of the links create a pulling force on the connection wire which, in turn, causes the side support units to rotate forwardly relative to the support panel so as to provide a lateral side support for a seat occupant;
    wherein the link units support the opposite ends of the support panel, and each of the link units comprises a double link structure including a front link hinged to the support panel and a rear link hinged to the mounting bracket.

2. The lumbar support device as set forth in claim 1, wherein an actuating wire is connected to each of the link units, wherein the actuating wire is connected to a hinge shaft provided between the front link and the rear link.

3. The lumbar support device as set forth in claim 2, wherein the actuating wires are connected to an operation control unit, the operation control unit generating an actuating force for extending the link units.

4. The lumbar support device as set forth in claim 2, wherein a guide member is provided on the mounting bracket to guide movement of the actuating wires, the actuating wires passing through the guide member.

5. The lumbar support device as set forth in claim 1, wherein each of the side support units comprises:
    a slide member provided on the support panel so as to be slidable in a longitudinal directional of the support panel;
    a rotary member coupled to the slide member so as to be rotatable;
    a locking member protruding from the rotary member at a predetermined angle relative to the rotary member, the locking member being connected to the corresponding connection wire; and
    an elastic spring for elastically supporting the slide member.

6. The lumbar support device as set forth in claim 5, wherein a slide slot is formed through each of the opposite ends of the support panel, and the slide member moves along the slide slot on the support panel.

7. The lumbar support device as set forth in claim 5, wherein the side support units comprise a first side support unit and a second side support unit which are respectively provided on the opposite ends of the support panel to surround the side portions of the lumbar region of the passenger.

8. A vehicle seat comprising the lumbar support device as set forth in claim 1.

* * * * *